United States Patent
Heidasch (10) Patent No.: US 8,972,520 B2
(45) Date of Patent: Mar. 3, 2015

(54) SYSTEMS AND METHODS PROVIDING MAPPING DEFINITION INFORMATION FOR BUSINESS DATA

(75) Inventor: Robert Heidasch, Speyer (DE)

(73) Assignee: SAP SE, Walldorf (DE)

( * ) Notice: Subject to any disclaimer, the term of this patent is extended or adjusted under 35 U.S.C. 154(b) by 696 days.

(21) Appl. No.: 12/969,907

(22) Filed: Dec. 16, 2010

(65) Prior Publication Data

US 2012/0158889 A1   Jun. 21, 2012

(51) Int. Cl.
*G06F 15/16* (2006.01)
*G06F 15/173* (2006.01)
*G06Q 10/06* (2012.01)

(52) U.S. Cl.
CPC .................................. *G06Q 10/067* (2013.01)
USPC ........... 709/217; 709/220; 709/224; 709/227; 709/230

(58) Field of Classification Search
CPC ... G06Q 10/06; G06Q 10/063; G06Q 10/067; G06Q 10/0631; G06Q 10/06311; G06Q 10/06312; G06Q 30/0226; G06Q 30/0283; G06Q 30/04; G06Q 30/06; G06Q 30/0601; G06Q 30/0627; G06Q 30/0641; G06Q 40/08; G06Q 40/12; H04L 12/14; H04L 12/1485; H04L 12/581; H04L 51/04; H04L 63/02; H04L 63/083; H04L 63/102; H04L 63/104; H04L 63/18
USPC .......................... 709/217, 220, 224, 227, 230
See application file for complete search history.

(56) References Cited

U.S. PATENT DOCUMENTS

| | | | |
|---|---|---|---|
| 2001/0013542 A1* | 8/2001 | Horowitz et al. | 235/380 |
| 2003/0065533 A1* | 4/2003 | Scheinkman | 705/1 |
| 2005/0127164 A1* | 6/2005 | Wankmueller | 235/380 |
| 2005/0160361 A1* | 7/2005 | Young | 715/513 |
| 2007/0168203 A1* | 7/2007 | Chan et al. | 705/1 |
| 2009/0171903 A1* | 7/2009 | Lin et al. | 707/3 |
| 2010/0223186 A1* | 9/2010 | Hogan et al. | 705/71 |
| 2011/0246240 A1* | 10/2011 | Hasan et al. | 705/3 |
| 2012/0089549 A1* | 4/2012 | Burckart et al. | 706/47 |

* cited by examiner

*Primary Examiner* — David Lazaro
*Assistant Examiner* — Farzana Huq
(74) *Attorney, Agent, or Firm* — Buckley, Maschoff & Talwalkar LLC (57) ABSTRACT

According to some embodiments, mapping definition information may be transmitted from a business process engine to a business process client. Subsequent to said transmitting, it may be arranged for the business process client to receive business data formatted in accordance with the mapping definition information. The business data may, for example, include a series of values, and the mapping definition information may be used by the business process client to map the series of values to a plurality of data fields.

18 Claims, 10 Drawing Sheets

FIG. 1

Prior Art

| DATE (MM) | CREDIT CARD NUMBER (1ST HALF) | DATE (YEAR) | AMOUNT | DATE (DD) | CREDIT CARD NUMBER (1ST HALF) |
|---|---|---|---|---|---|
| 0 7 | 1 2 3 4 5 6 7 8 | 2 0 1 5 | 0 0 1 5 0 0 0 0 | 0 4 | 9 0 1 2 3 4 5 6 |

*FIG. 10*

SYSTEMS AND METHODS PROVIDING MAPPING DEFINITION INFORMATION FOR BUSINESS DATA

FIELD

Some embodiments relate to business data. More specifically, some embodiments are associated with systems and methods that provide mapping definition information for business data.

BACKGROUND

Figure 1:
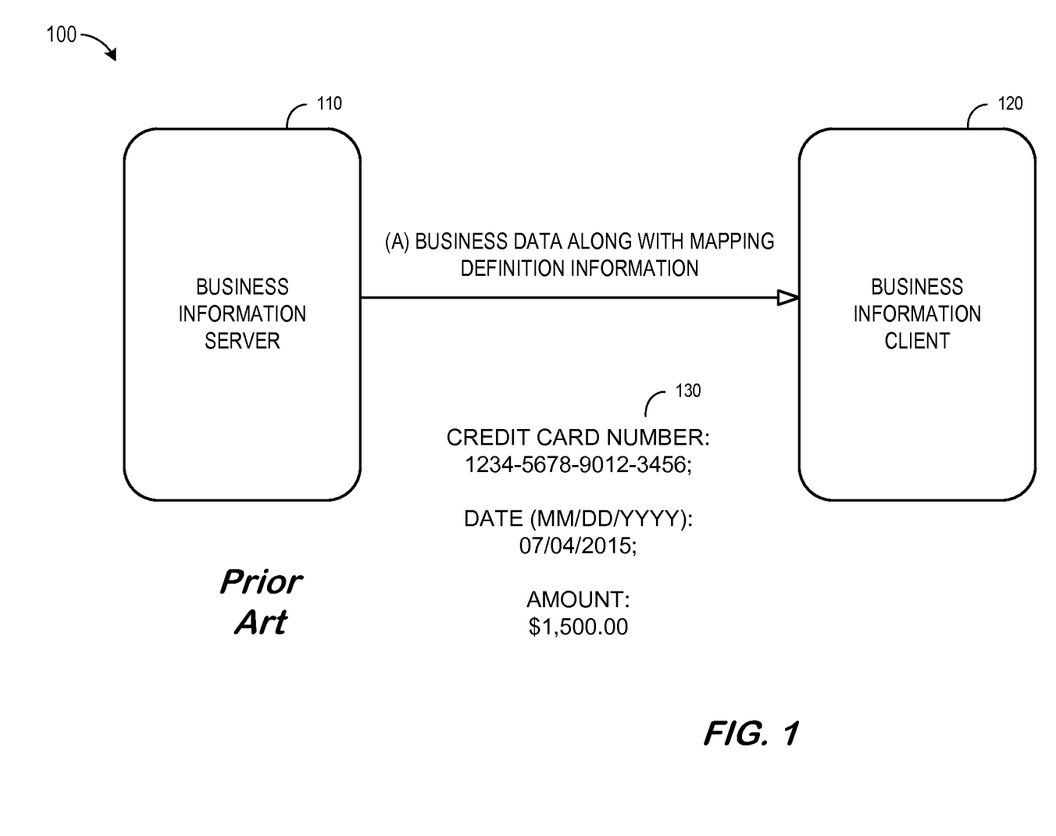
FIG. 1 is a block diagram of a typical business information system.

An enterprise may need to transmit business data between devices. For example, an organization may need to transmit business data from a business server to a remote client, such as a user's Personal Computer (PC), so that the user can view and/or manipulate business information. FIG. 1 is a block diagram of a typical business information system 100 wherein a business information server 110 transmits business data 130 to a business information client 120 at (A). The transmitted business data 130 may include a number of field labels and associated values for each of the labels. That is, the transmitted business data 130 may implicitly or explicitly include a mapping of each value to a meaning for that value (e.g., the value of "$1,500.00" is mapped to a transaction "Amount" as illustrated in FIG. 1).

Such an approach, however, may have several disadvantages. Business data is often sensitive in nature, and if an unauthorized party obtained the transmitted business data 130 is might be relatively simple to determine the meaning of the information (e.g., to determine a bank or credit card number). Moreover, the amount of mapping information included in the transmitted business data 130 can be relatively large, increasing the amount of time required to transmit the information and potentially degrading the performance of the system 100.

Accordingly, systems and methods to securely and efficiently transmit business information may be provided in association with some embodiments described herein.

DETAILED DESCRIPTION

An enterprise may need to transmit business data between devices. For example, an organization may need to transmit business data from a business information server to a remote business information client, such as a user's PC, so that the user can view and/or manipulate business information. When the transmitted business data implicitly or explicitly includes a mapping of each value to a meaning for that value (as described with respect to FIG. 1), the security of the information may be compromised and the amount of data that needs to be transmitted may be relatively large.

Figure 2:
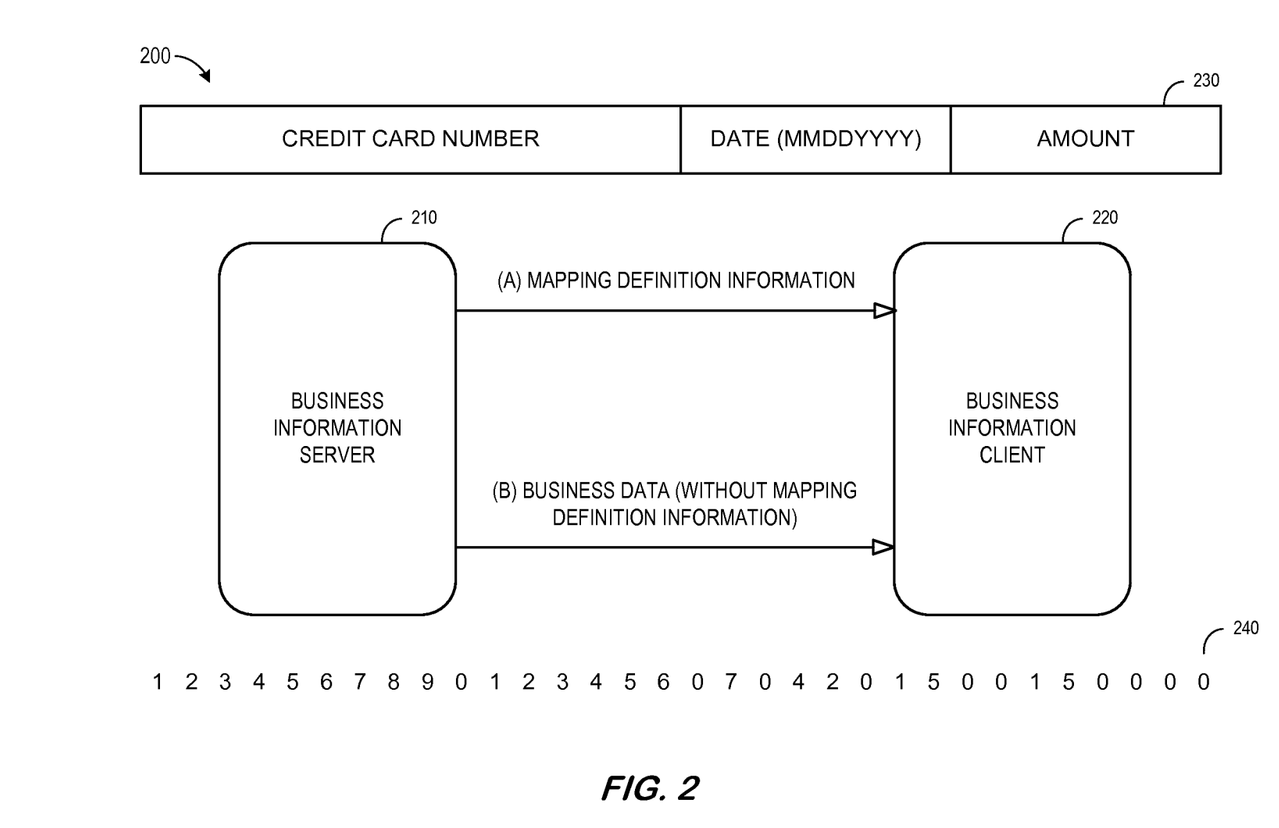
FIG. 2 is a block diagram of a typical business information system according to some embodiments.

Accordingly, systems and methods to securely and efficiently transmit business information may be provided in association with some embodiments described herein. For example, FIG. 2 is a block diagram of a business information system 200 according to some embodiments. In this case, a business information client 220 initially receives at (A) mapping definition information 230 from a business information server 210. The mapping definition information 230 may, for example, map a series of values that will be later received to a plurality of data fields (e.g., the first sixteen characters may be associated with a credit card number while the next eight characters are associated with a date). The mapping definition information 230 might, according to some embodiments, be transmitted to the business information client 220 via the Internet and/or a wireless network.

Figure 3:
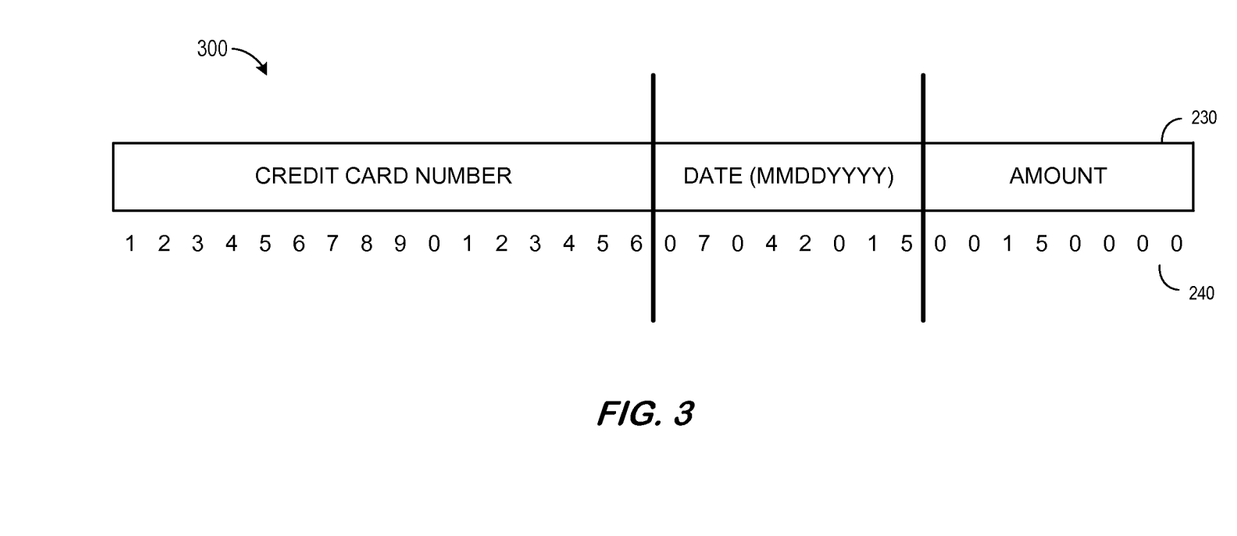
FIG. 3 illustrates a mapping of values to data fields according to some embodiments.

The business information client 220 later receives business data 240 (without any associated mapping definition information) at (B). Although FIG. 2 illustrates that the business data 240 is received from the business information server 210, note that the business data 240 might instead be received from another data provider. The business data 240 might simply include a series of numbers or values. The business process client 220 may then interpret the business data 240 based on the previously received mapping definition information 230 to execute a business process or task for a user. For example, FIG. 3 is an illustration 300 of how the business data 240 may be interpreted based on the mapping definition information 230 (e.g., the date of the transaction was "Jul. 4, 2015").

Note that if an unauthorized party somehow obtained the business data 240, the meaning of the data would not be revealed. For example, he or she would be unable to determine which characters were associated with a credit card number. Similarly, if an authorized party only had access to the mapping definition information 230 no sensitive data would be uncovered. In this way, the system 200 may provide a more secure environment as compared to FIG. 1.

Further note that additional sets of business data may be transmitted from the business information server 210 to the business information client 220 without re-sending the mapping definition information. As a result, the performance of the system 200 may be improved as compared to FIG. 1—especially when a substantial number of sets of business data are transmitted (e.g., thousands of sets may be transmitted without mapping definition information). Also note that although the mapping illustrated in FIGS. 2 and 3 is relatively simple, in practice the mapping definition information 230 might be associated with Extensible Markup Language ("XML") or Extensible Application Markup Language ("XAML") protocols. In some cases, the amount of information than needs to be transmitted may be 10 or even 100 times less as compared to FIG. 1. In the example of FIGS. 2 and 3, the mapping definition information 230 defines the first sixteen digits as representing a credit card number, the next eight digits representing a formatted date value, the next six digits representing a transaction US dollar amount value, and the last two digits representing a US cent amount value.

Figure 4:
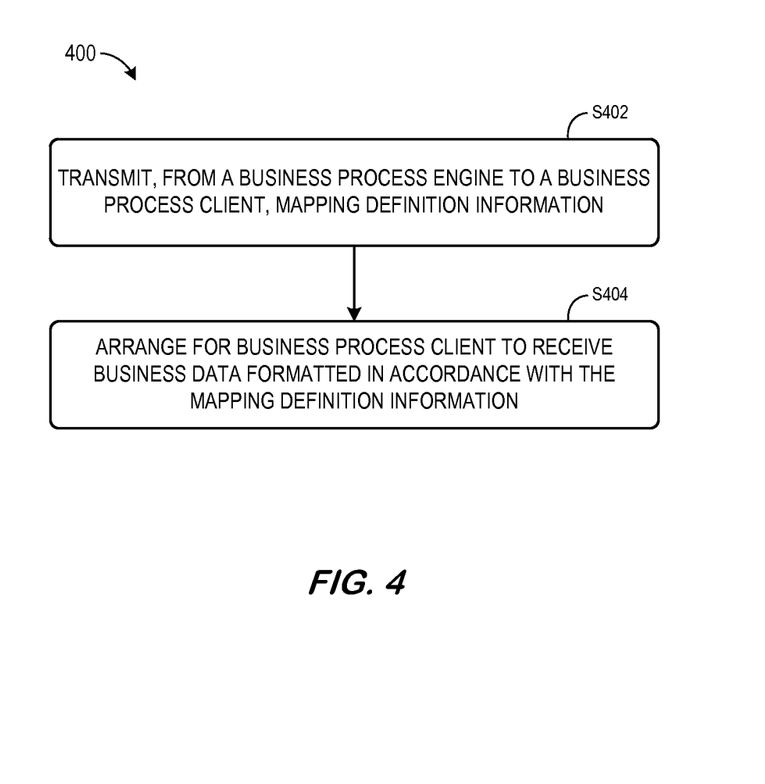
FIG. 4 is a flow diagram of a process that might be performed by a server in accordance with some embodiments.

FIG. 4 is a flow diagram of a process 400 in accordance with some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S402, mapping definition information may be transmitted from a business process engine to a business process client. The mapping definition information may, for example, be associated with the XML and/or XAML protocols.

At S404, it may be arranged for the business process client to receive business data formatted in accordance with the mapping definition information. For example, the client may receive the formatted business data from the business process engine or a business data provider. According to some embodiments, the business data includes a series of values, and the mapping definition information maps the series of values to a plurality of data fields. Moreover, according to some embodiments, it may be arranged for the formatted business data to be encrypted before being received by the business process client. The business process client may then decrypt the business data before applying the mapping definition information.

Note that subsequent to the sending of business data at S404, it may be arranged for the business process client to receive additional business data formatted in accordance with the mapping definition information. For example, thousands of additional sets of business data may be received by the business process client without receiving additional mapping definition information.

According to some embodiments altered mapping definition information may be transmitted from the business process engine to the business process client. This might be performed, for example, when a new data field is added to the business data. In other cases, the mapping definition information may be periodically alters as a security measure. In either case, it may then be arranged for the business process client to receive business data formatted in accordance with the altered mapping definition information (instead of the original mapping definition information). According to some embodiments, the business data may include a version number or other identifier associated with the mapping definition information so that the business process client can determine whether or not it has the proper mapping definition information. If the business process client does not have the proper mapping definition information, it may request an update from the business process server.

According to some embodiments, the mapping definition information and/or business data are associated a business process, a "business object," and/or or a User Interface (UI). As used herein, the phrase "business object" may refer to, for example, a software entity representing real-world items used during the transaction of business. For example, a business object may represent a business document such as a sales order, a purchase order, or an invoice. A business object may also represent items such as a product, a business partner, or a piece of equipment.

A business object may include business logic and/or data having any suitable structure. The structure of a business object may be determined based on the requirements of a business scenario in which the business object is to be deployed. A business solution for a particular business scenario may include many business objects, where the structure of each business object has been determined based on the requirements of the particular business scenario.

Note that one business object may receive information from or provide information to other business objects. For example, when an "order quantity" in a purchase order business object is modified, an "amount due" in an associated invoice business object may be automatically updated. Moreover, in some cases, business objects may have predefined relationships with each other. A business object may be stored in a storage device, such as by storing information in a database table on a hard disk drive. At times, the business object may be transmitted to other devices.

Figure 5:
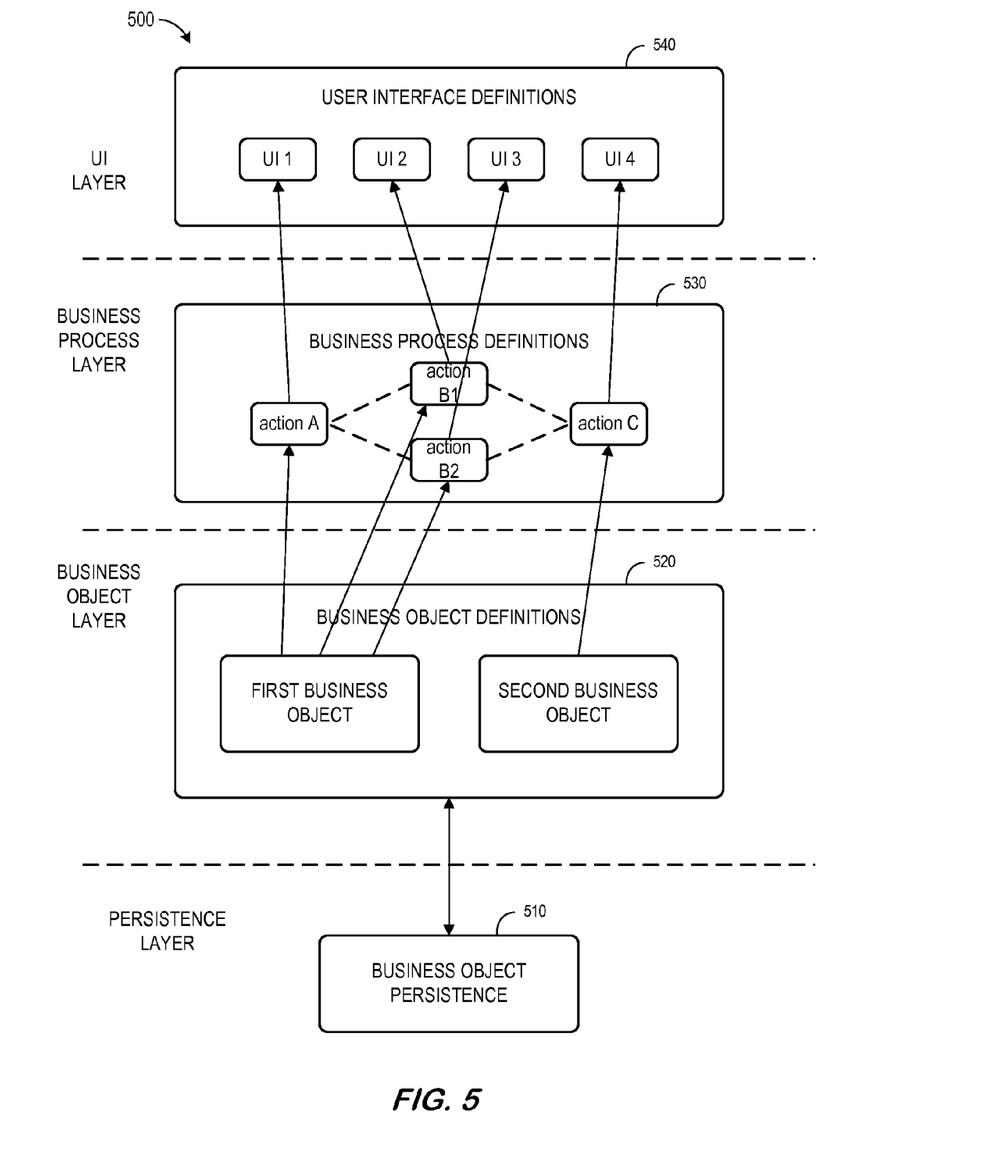
FIG. 5 is a diagram illustrating business application layers in accordance with some embodiments.

For example, FIG. 5 is a diagram 500 illustrating application layers in accordance with some embodiments. Note that business applications may be associated with business process-oriented and business object-based applications. As shown in FIG. 5, business objects persistence 510 in a persistence layer may be used to establish first and second business objects in a business object definitions 520 portion of a business object layer. From a design time perspective, these business objects and/or enterprise services in the business object layer may map to a business process (actions A, B1, B2, and C) in business process definitions 530 portion of a business process layer. This business process may include tasks assigned to UIs (1 through 4) in a user interface definitions 540 portion of a UI layer that supports task execution by a particular user.

The business data may be stored, for example, in the business object persistence 510 and business object definitions 520 to encapsulate business relevant data and support its manipulation. Such an approach may allow the access and modification of business related data and a BO state (e.g., created, modified, or saved). The operations may also be used to build BO web services and may access business data in a service-oriented solution.

According to some embodiments, the business object definitions 520 may be extended and provide Business Object ("BO") semantic validators, such as model and/or code information that may be assigned to the particular business elements, groups, and BO nodes to allow for the semantic validation of BO related content and data. Note that the UI elements may be described using declarative languages (e.g., XAML) and the business semantic assignment may extend the UI definition making the executable web application. The business data itself may be handled separately, according to some embodiments, which may extend the flexibility of the system.

Figure 6:
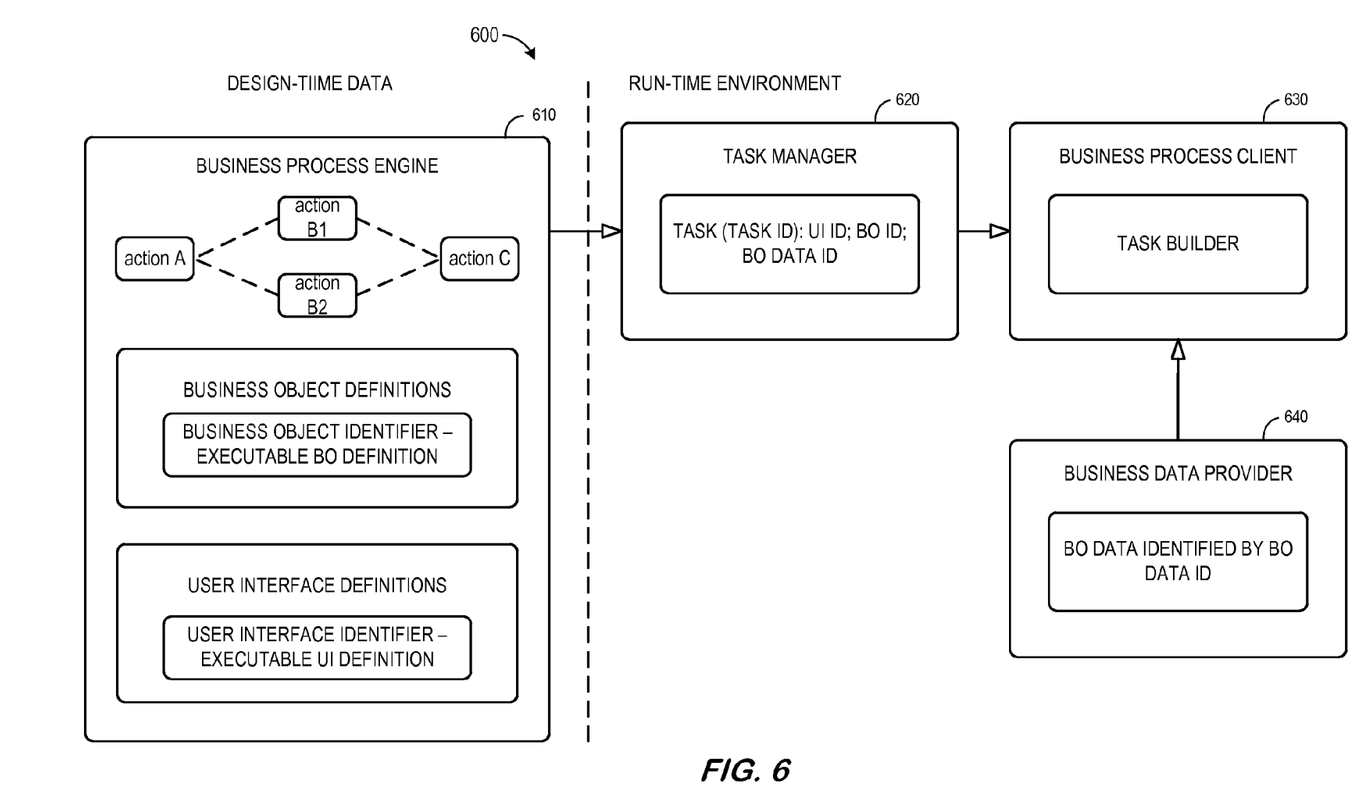
FIG. 6 is an architecture overview of a secure and modular business process platform in accordance with some embodiments.

Thus, some embodiments described herein may use a separation between the UI, application, business semantic, application, and/or business data to define an executable task while increasing the security of transferred data in business process and reducing the amount of transferred data. In particular, FIG. 6 is an architecture overview of a secure and modular business process platform 600 in accordance with some embodiments. According to some embodiments, the secure and modular business process platform 600 might include a business process engine 610 including a design time repository for defining business objects, UIs, business process elements, and tasks. According to some embodiments, the business process engine might be divided into separate design-time tools (e.g., a BO modeling tool, a UI modeling tool, and a BPM modeling tool) and runtime environment.

A task manager 620 may provide central management of started business processes (e.g., workflows). Each process may, according to some embodiments, be identified by a process identifier ("ID") and task (action in process) identified by a task ID. Regarding definition, the task manager 620 may give a business process client 630 a user specific view and/or access to particular tasks. The task manager 620 may also provide an administrative view of a business process (e.g., status or ownership information).

A business data provider 640 or system may manage business data (e.g., providing data storage, persistence, and/or versioning). The business process client 630, such as a Rich Client Application ("RCA") that supports the performance of tasks, may include a task builder which builds an executable task from a task definition. To create the task, the client (or end-user) may connect to the task manager 620 to obtain the task definition, including the following information:

(1) a task definition identified by a task identifier;

(2) an ordered list of UIs (including a UI ID identifying the UI definition in a UI repository, a UI version number, and a UI order representing an order of processed UIs (e.g., in connection with a definition of a wizard interface));

(3) a list of used business objects (including BO identifier, BO version number); and (4) business object data (including a BO data identifier, a BO data version, and a BO data source (e.g., associated with the business data provider 640 or system that owns or transmits the required BO data)).

Using this, the business process client 630 may call the business process engine 610 (e.g., a design time repository) and/or business data provider 640 and obtain the appropriate data. Because the client keeps a copy of the UI definition and BO definition locally, the call might only be performed when the locally stored version numbers do not match the ones associated with the task being built. That is, when the versions are the same the business process client 630 does not need to call the business process engine 610.

By way of example, during an initial first task execution, the business process client 630 may obtain all of the required definition data—including UI and BO versions. The UI elements may be defined, for example, using a declarative language that permits real time compilation and execution in the client application (e.g., XAML data).

Note that the BO may exists as a design-time BO, representing the BO definition that includes a definition of the BO structure, BO states, BO operations, BO web services, and/or BO semantic validators. The BO may also exist as a run-time BO compiled from a design-time BO, which may be ready to execute in different environments (e.g., an ABAP system, Java VM, or Microsoft CR-VM). The run-time BO may contain an encryption manager, according to some embodiments, which may facilitate a secure transfer of business data from and to the business data provider 640. The BO definition and BO data may be stored separately (e.g., a BO instance may be created by a task manager in a client application). The BO definition may contain an encryption manager and may be used by the business data provider 640 to create encrypted (in a BO-specific way) BO data that may be transferred in a secure channel to business process client 630.

The BO structure may be used to generate respective program structures in the runtime BO that provides the BO data container functionality and allows data storage and/or hibernation. The BO semantic validators may be, according to some embodiments, generated as executable code (e.g., environment and/or language dependant code for ABAP, Java, or C#) that may be used to validate the BO data consistency (e.g., input in composite applications, web clients, or remote applications).

The BO definition may support the transferring of the business data from and/or to the business data provider 640. The BO may also be associated with a bottom data management layer that provides the BO data container and persistence functionality that allow the storing of the BO in BO data store. The data management layer may also convert the BO instance data to transferable and/or transportable form and save the instance in the BO data store The BO may also be associated with a middle BO business logic layer that defines the business logic for the BO data consistency. This layer may use the BO semantic validators to validate BO data and/or provide error messages. The BO may also be associated with a top operations layer that defines particular operations supported by the BO, the BO states, and/or modifications (e.g., when the BO was created or modified).

Figure 7:
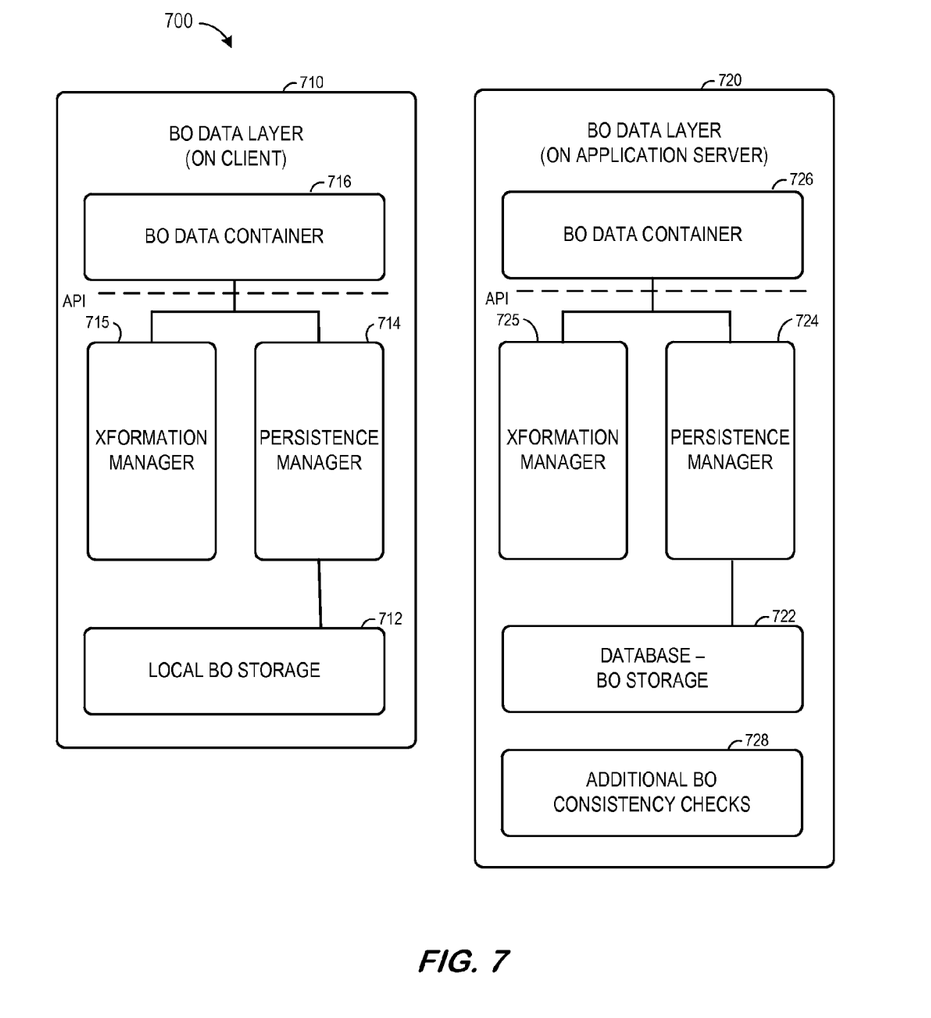
FIG. 7 illustrates a data layer in accordance with some embodiments.

FIG. 7 illustrates a data layer 700 in accordance with some embodiments. In particular, a BO data layer on a client 710 includes a transformation manager 715 (or module) and a persistence manager 714 (or module) with access to a BO data container 716. A BO data layer on an application server 720 also includes a transformation manager 725 (or module) and a persistence manager 724 (or module) with access to a BO data container 726. According to some embodiments, access to the BO data containers 716, 726 may be provided in connection with an Application Programming Interface (API).

Thus, persistence managers 714, 724 may exist on both the client and the server BO data layers 710, 720. Note, however, that the BO definition may be associated with two different types of persistence. On the server, the persistence manager 720 may allow persisting BO data in a database for BO storage 722. On the client, the persistence manager 712 may provide local BO storage 712 via a local, client-specific store (e.g., a file system). This temporary persistence may be used, for example, when the client works "off-line" with the BO.

According to some embodiments, additional BO consistency checks 728 may be provided in the server BO data layer 720. The additional BO consistency checks 728 may, for example, be responsible for internal BO-consistency checks that are not executed on the client (e.g., associated with missing data on client or complicated calculations).

As used herein, the transformation managers 715, 725 of the client and server BO data layers 710, 720 may contain BO-specific transformation/encryption/decryption modules. The transformation managers 715, 725 may be responsible for the BO-specific encryption of the BO data (on the server side, the transformation manager 725 may exchange BO data with the client-and on the client side, the transformation manager 715 may exchange BO data with the server). Note that this security element may be provided independent of a secure communication channel used to transfer data between the client and the server, such as a Secure Socket Layer ("SSL") connection.

Because the BO data may be sensitive in nature, note that the security aspects of the BO transportation may be important. For example, the encryption modules associated with the transformation managers 715, 725 may provide the BO with a specific encryption method and allow for a transfer of BO data between a business data provider and client application. Additionally, data may be sent without message definition (but may be signed with a message key that allows a receiver of the business data to "map" information using previously received mapping definition information).

Thus, the message and information transfer may be secure because the BO and UI definition, or mapping definition information, is only sent once (which may also improve performance). In addition, if an unauthorized party obtains a BO data package (a send message with data), he or she will not understand the information without the associated BO definition. Moreover, because the XML definition is separated from the data or object definition (e.g., class definition), reductions in the size of data packages may be achieved.

Figure 8:
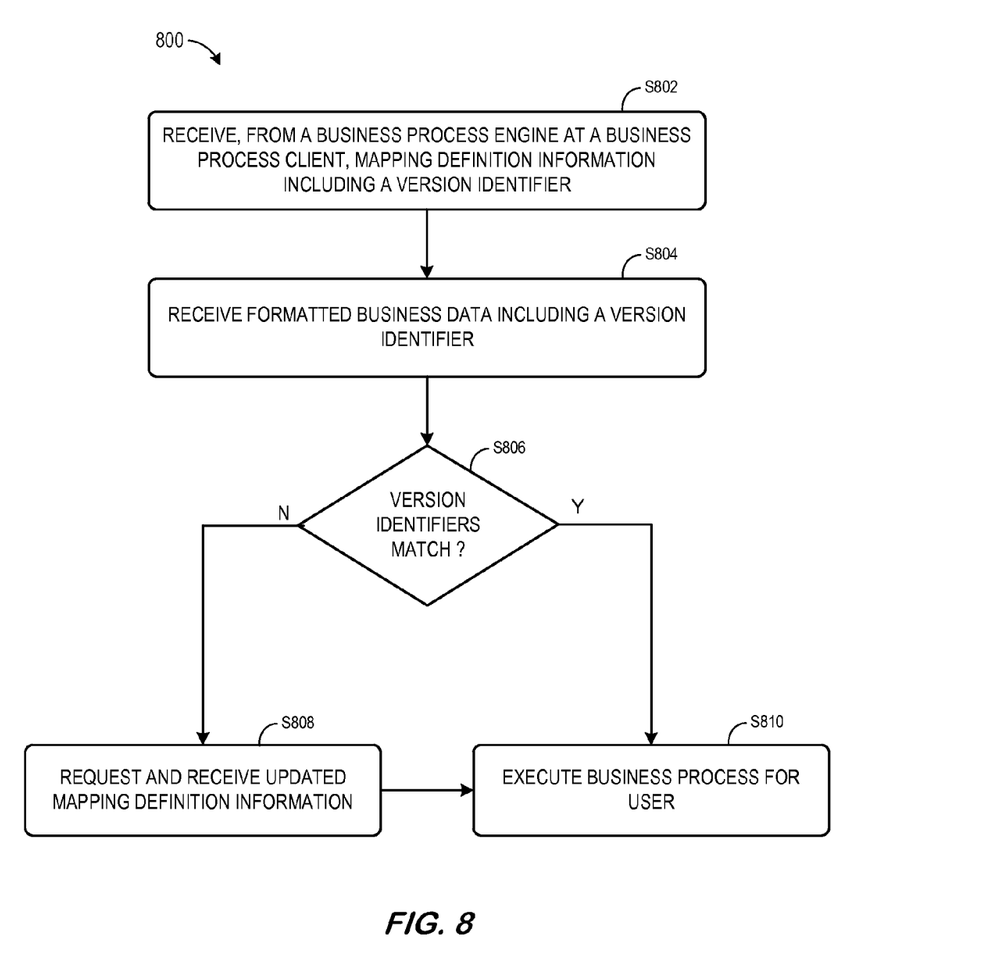
FIG. 8 is a flow diagram of a client process that might be performed in accordance with some embodiments.

FIG. 8 is a flow diagram of a client process 800 that might be performed in accordance with some embodiments. At S802, mapping definition information is received at a business process client from a business process engine. The mapping definition information includes or is otherwise associated with a version identifier. At S804, the business process client receives formatted business data including a version identifier. If the version identifiers match at S806, the business process client can simply use the mapping to execute a business process for a user at S810. If the version identifiers do not match at S806 (e.g., the business process client has an older version of the mapping), the business process client can request and receive updated mapping definition information from the business process engine at S808. The business process client may then use the updated mapping to execute a business process for a user at S810.

Note that FIG. 8 illustrates the client process 800 from the BO perspective, and a similar process may be associated with UI components. For example, if the version of a BO definition and BO data differ, the client may start loading the BO appropriate definition (to build the correct BO instance on the client side, the version of the BO definition and BO data must be the same). This may also be the case with UI components. That is, the version of the BO definition and UI definition might need to be the same (otherwise, the BO instance might not be usable by the UI components).

Figure 9:
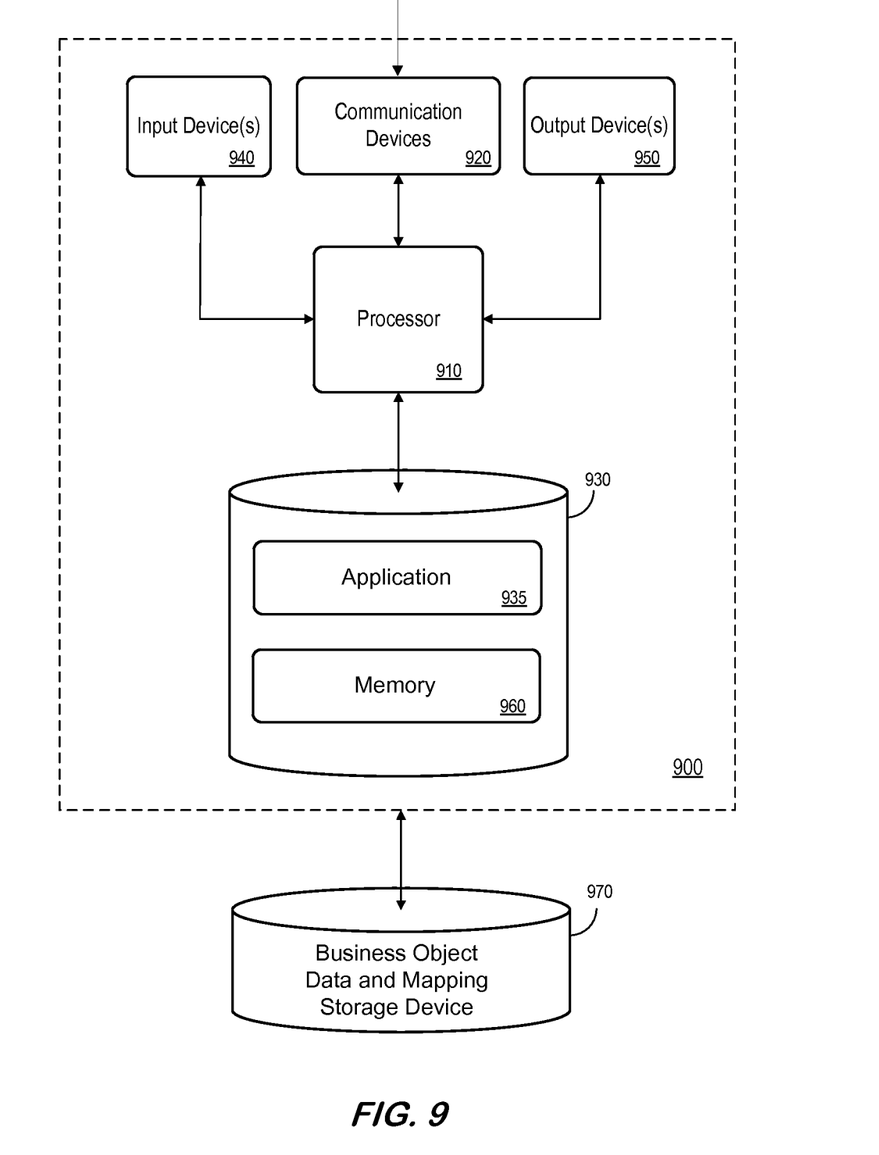
FIG. 9 is a block diagram of a system in accordance with some embodiments.

The processes described herein with respect to FIGS. 2 through 8 may be executed by any number of different hardware systems and arrangements. For example, FIG. 9 is a block diagram of a platform or system 900 in accordance with some embodiments. The platform 900 may include a server processor 910, such as one or more Central Processing Units ("CPUs"), coupled to communication devices 920 configured to communicate with remote devices (not shown in FIG. 9). The communication devices 920 may be used, for example, to exchange business information with remote devices. The server processor 910 is also in communication with an input device 940. The input device 940 may comprise, for example, a keyboard, computer mouse, and/or a computer media reader. Such an input device 940 may be used, for example, to receive mapping definition information from an administrator. The server processor 910 is also in communication with an output device 950. The output device 950 may comprise, for example, a display screen or printer. Such an output device 950 may be used, for example, to provide mapping definition information and/or business data to an administrator.

The server processor 910 is also in communication with a storage device 930. The storage device 930 may comprise any appropriate information storage device, including combinations of magnetic storage devices (e.g., hard disk drives), optical storage devices, and/or semiconductor memory 960. The storage devices may have different access patterns, such as Random Access Memory ("RAM") devices, Read Only Memory ("ROM") devices and combined RAM/ROM devices. The system 900 may be coupled to a business object data and mapping storage device 970. The business object data and mapping storage device 970 may, according to some embodiments, store non-transitory database tables associated with a mapping of fields and values for business objects.

As used herein, information may be "received" by or "transmitted" to, for example: (i) the system 900 from other devices; or (ii) a software application or module within the system 900 from another software application, module, or any other source.

The storage device 930 stores an application 935 for controlling the server processor 910. The server processor 910 performs instructions of the application 935, and thereby operates in accordance any embodiments of the present invention described herein. For example, the server processor 910 may transmit mapping definition information to a business process client. Subsequent to said transmitting, it may be arranged for the business process client to receive business data formatted in accordance with the mapping definition information. The business data may, for example, include a series of values, and the mapping definition information may be used by the business process client to map the series of values to a plurality of data fields.

In this way, efficient systems and methods may be provided in connection with the transport of business data (including business objects). Moreover, the security of the information may be improved. Note that embodiments may be used by different clients (e.g., composite applications, web service clients, and/or remote business applications) to support an automatic handling of business processes (workflows). Some embodiments may provide a task/action split to allow for the separate handling of UI definition, BO definition, and/or BO data.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the databases described herein may be combined or stored in external systems). Moreover, although examples of specific types of business objects have been described, embodiments of the present invention could be used with other types of databases and/or database tables.

Figure 10:
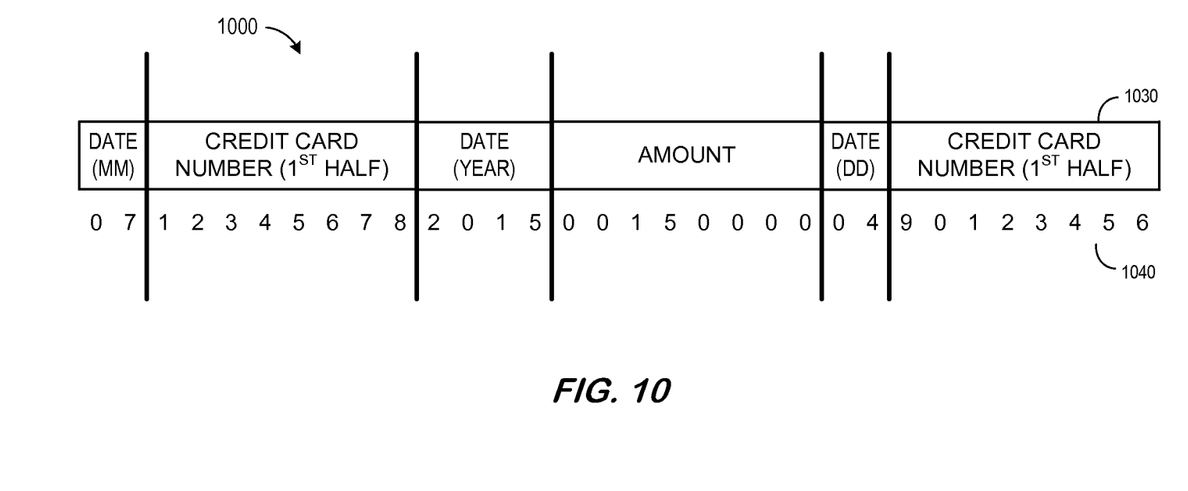
FIG. 10 illustrates a mapping of values to data fields according to another embodiment.

Moreover, the particular mappings described herein are by way of example only and any other types of mappings may be provided instead. Consider, for example, FIG. 10 which illustrates a mapping 1000 of values to data fields according to another embodiment. In particular, mapping definition information 1030 indicates that some of the fields and associated values in received business data 1040 have been divided (e.g., the credit card number field has been divided into two portions as illustrated in FIG. 10). That is, at least some of the values may be non-contiguously included in the business data 1040. For example, values may be split into portions which are interleaved with other values and/or transmitted separately. Moreover, the mapping definition information 1030 may comprise information associated with scrambling and/or encrypting these portions. Similarly, the mapping definition information 1030 may be associated with an order in which values are transmitted within the business data 1040 (and the order may be different than, for example, an order in which information is displayed to a user and/or processed by a computer).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method implemented by a computing system in response to execution of program code by a processor of the computing system, the method comprising:
    transmitting, from a business process engine to a business process client, mapping definition information;

subsequent to said transmitting, arranging for the business process client to receive business data formatted in accordance with the mapping definition information;
wherein the business data includes a series of values, the mapping definition information maps the series of values to a plurality of data fields, and each of the plurality of data fields is represented in the mapping definition information by at least one field label that is included in the mapping definition information but not included in the business data;
the method further comprising:
receiving, by the business process client, the business data from a business data provider that executes a process that associates the series of values to the plurality of data fields; and
subsequent to receiving the mapping definition information and the business data, applying the mapping definition information at the business process client to map the series of values to the plurality of data fields to execute a business process;
wherein one of the series of values included in the business data is mapped by the mapping definition information to one of the plurality of data fields;
wherein the one of the series of values that is mapped to the one of the plurality of data fields is split into a first portion and a second portion that are separated from one another, in the business data, by at least one other of the series of values included in the business data; and
wherein the at least one other of the series of values is not a part of the one of the series of values that is mapped to the one of the plurality of data fields.

2. The method of claim 1, wherein at least some of the values are non-contiguously included in the business data.

3. The method of claim 1, further comprising:
subsequent to said transmitting of the business data, arranging for the business process client to receive additional business data formatted in accordance with the mapping definition information.

4. The method of claim 1, further comprising:
transmitting, from the business process engine to the business process client, altered mapping definition information;
subsequent to said transmitting of the altered mapping definition information, arranging for the business process client to receive business data formatted in accordance with the altered mapping definition information.

5. The method of claim 1, wherein the mapping definition information is associated with at least one of: (i) a business object, (ii) a user interface, (iii) a business process, (iv) extensible markup language information, or (v) extensible application markup language information.

6. The method of claim 5, wherein the business data is associated with a web service used to access business data in a service oriented solution.

7. The method of claim 1, further comprising:
arranging for the formatted business data to be encrypted before being received by the business process client.

8. The method of claim 1, wherein the business data includes a version number associated with the mapping definition information, wherein the business process client may request updated mapping definition information based on the version number.

9. A non-transitory, computer-readable medium storing program code executable by a computer to perform a method, said method comprising:
receiving, at a business process client from a business process engine, mapping definition information;
subsequent to said receiving of the mapping definition information, receiving business data formatted in accordance with the mapping definition information;
wherein the business data includes a series of values, the mapping definition information maps the series of values to a plurality of data fields, and each of the plurality of data fields is represented in the mapping definition information by at least one field label that is included in the mapping definition information but not included in the business data; and
wherein the receiving business data comprises:
receiving, at the business process client, the business data from a business data provider that executes a process that associates the series of values to the plurality of data fields;
the method further comprising:
subsequent to receiving the business data, applying the mapping definition information at the business process client to map the series of values to the plurality of data fields to execute a business process;
wherein one of the series of values included in the business data is mapped by the mapping definition information to one of the plurality of data fields;
wherein the one of the series of values that is mapped to the one of the plurality of data fields is split into a first portion and a second portion that are separated from one another, in the business data, by at least one other of the series of values included in the business data; and
wherein the at least one other of the series of values is not a part of the one of the series of values that is mapped to the one of the plurality of data fields.

10. The medium of claim 9, wherein the method further comprises:
executing a business process for a user in accordance with the business data and the mapping definition information.

11. The medium of claim 9, wherein the method further comprises:
subsequent to said receiving of the business data, receiving additional business data formatted in accordance with the mapping definition information.

12. The medium of claim 9, wherein the method further comprises:
receiving, at the business process client from the business process engine, altered mapping definition information;
subsequent to said receiving of the altered mapping definition information, receiving business data formatted in accordance with the altered mapping definition information.

13. The medium of claim 9, wherein the mapping definition information is associated with at least one of: (i) a business object, (ii) a user interface, (iii) a business process, (iv) extensible markup language information, or (v) extensible application markup language information.

14. The medium of claim 13, wherein the business data is associated with a web service used to access business data in a service oriented solution.

15. The medium of claim 9, wherein the formatted business data is encrypted.

16. The medium of claim 9, wherein the business data includes a version number associated with the mapping definition information.

17. A system, comprising:
a business process engine that includes a processor and a memory and is to transmit mapping definition information associated with a first type of business object; and a business process client to: (i) receive the mapping definition information, (ii) receive business data for a business object of the first type formatted in accordance with the mapping definition information, and (iii) execute a business process, associated with the business object of the first type, for a user in accordance with the business data and the mapping definition information;

wherein the business data includes a series of values, the mapping definition information maps the series of values to a plurality of data fields, and each of the plurality of data fields is represented in the mapping definition information by at least one field label that is included in the mapping definition information but not included in the business data;

the system further comprising:

a data provider to: (i) execute a process that associates the series of values to the plurality of data fields and (ii) transmit the formatted business data to the business process client;

the business process client further to:

apply the mapping definition information to map the series of values to the plurality of data fields to execute a business process;

wherein one of the series of values included in the business data is mapped by the mapping definition information to one of the plurality of data fields;

wherein the one of the series of values that is mapped to the one of the plurality of data fields is split into a first portion and a second portion that are separated from one another, in the business data, by at least one other of the series of values included in the business data; and wherein the at least one other of the series of values is not a part of the one of the series of values that is mapped to the one of the plurality of data fields.

18. The system of claim 17, wherein the mapping definition information is further associated with at least one of: (i) a user interface, (ii) a business process, (iii) extensible markup language information, or (iv) extensible application markup language information.

\* \* \* \* \*